Feb. 3, 1959　　　A. T. C. BURROWS　　　2,872,056
CONVEYOR SYSTEMS

Filed March 19, 1957　　　　　　　　　　　5 Sheets-Sheet 1

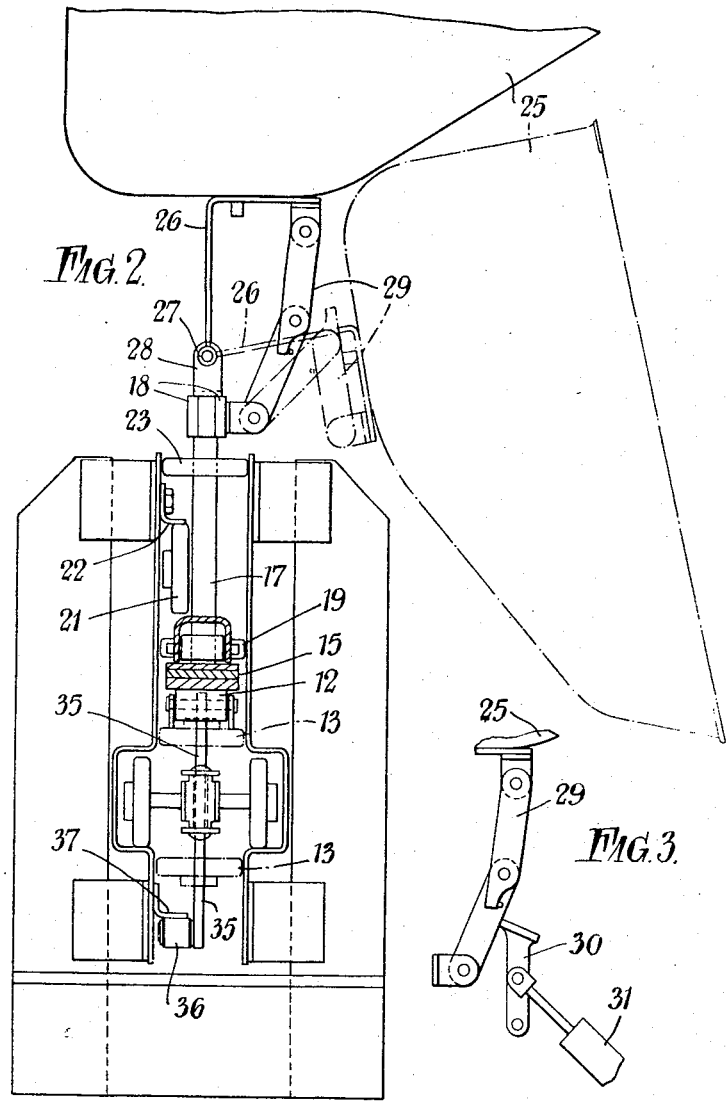

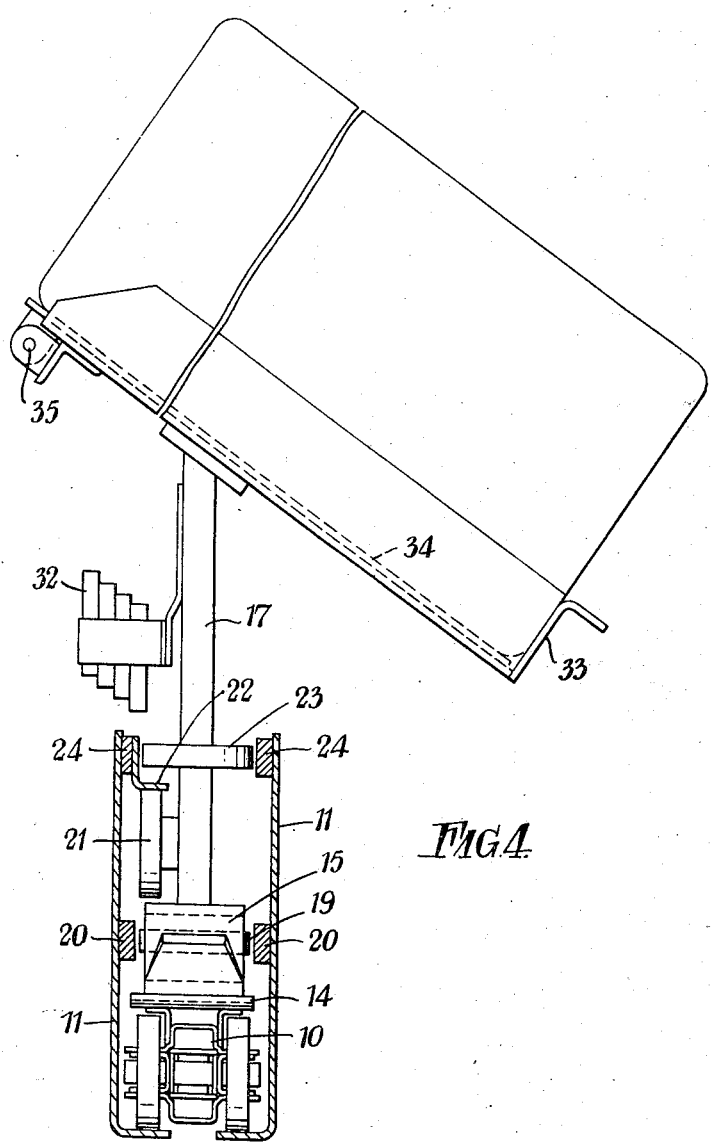

Feb. 3, 1959   A. T. C. BURROWS   2,872,056
CONVEYOR SYSTEMS
Filed March 19, 1957   5 Sheets-Sheet 4

Feb. 3, 1959 — A. T. C. BURROWS — 2,872,056
CONVEYOR SYSTEMS

United States Patent Office 2,872,056
Patented Feb. 3, 1959

2,872,056
CONVEYOR SYSTEMS

Arthur Thomas Charles Burrows, Stevenage, England, assignor to Geo. W. King Limited, Stevenage, England, a British company Application March 19, 1957, Serial No. 647,152

Claims priority, application Great Britain March 19, 1956

12 Claims. (Cl. 214—64)

This invention relates to conveyor systems and more particularly to such systems of the kind comprising an endless conveyor chain adapted to run in a fixed track such chain being adapted to support a plurality of load carriers in such a manner that while such carriers will normally travel with the chain they may nevertheless be stopped at any time without interrupting or in any way interfering with the drive to such chain.

According to the present invention in a conveyor system of the kind set forth the load carriers are so constructed as to support loads above the level of the chain and means are provided to prevent undesired lateral or tilting movement of said carriers.

Figure 1:
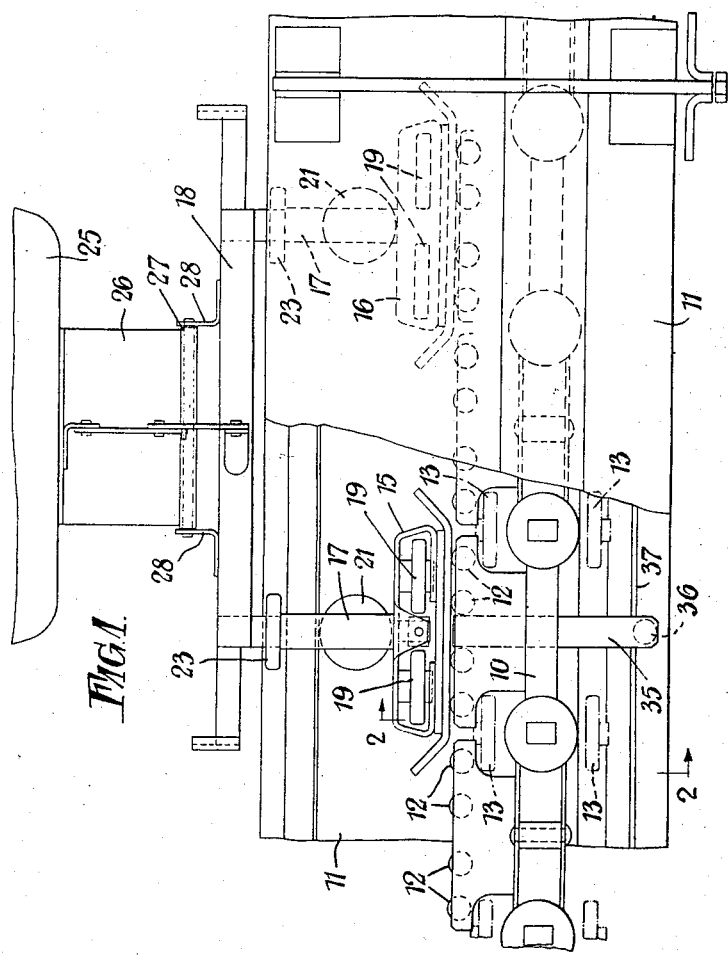
Figure 5:
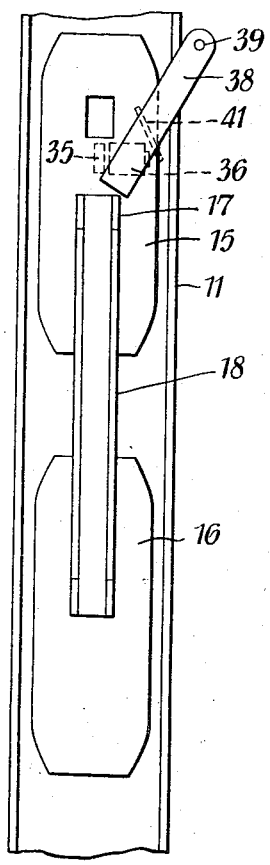
Figure 6:
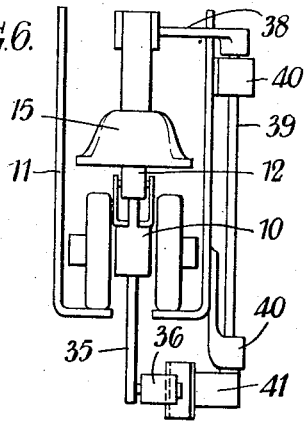
Figure 7:
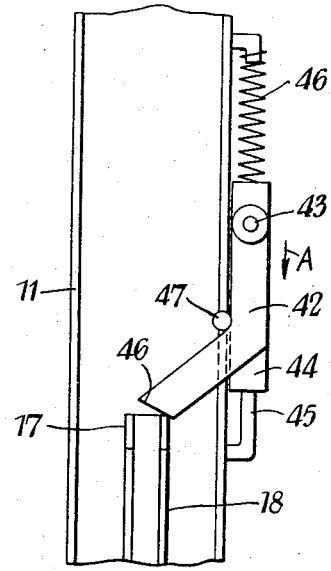
Figure 8:
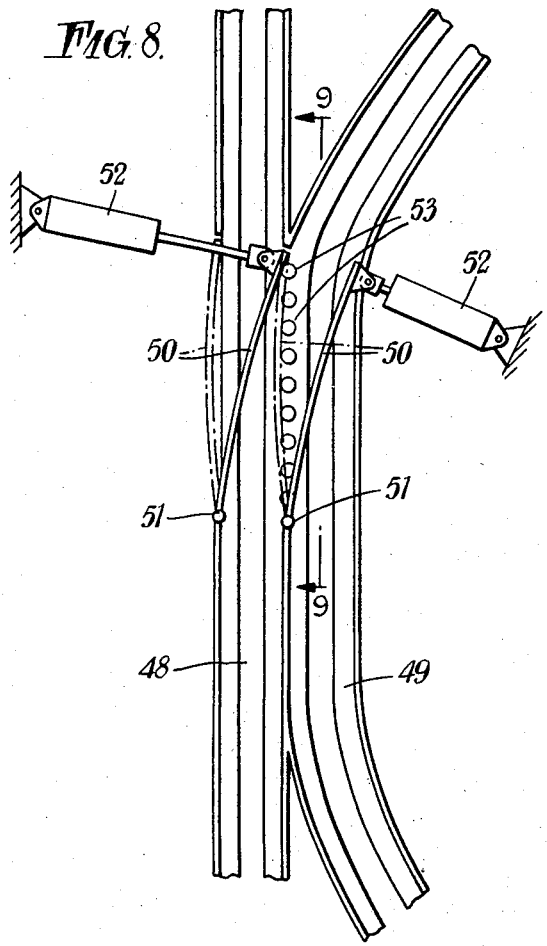
Figure 9:
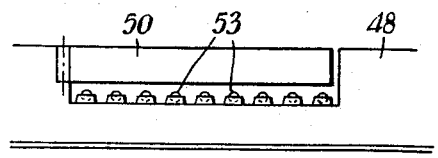

In order that the said invention may be clearly understood and readily carried into effect the same will be hereinafter more fully described with reference to the accompanying drawings in which:

Figure 1 is a side elevational view showing a part of a conveyor and illustrating one way in which a load carrier may be supported thereon, Figure 2 is an end elevational view looking from the left of Figure 1 there being a part in section on the line 2—2 of Figure 1, Figure 3 is a detail view illustrating a mechanism for effecting unloading of a load carrying tray or basket incorporated in the load carrier of Figures 1 and 2, Figure 4 is a cross sectional view through a conveyor incorporating a driving chain different from that shown in Figures 1 and 2, the load carrier in this case also being of different type, Figures 5 and 6 are respectively a diagrammatic plan and end elevational view of an arrestor or stop mechanism for holding the trolley of a load carrier prior to the engagement with such trolley of a driving dog or abutment on the conveyor chain, Figure 7 is a diagrammatic plan view of a different form of arrestor mechanism, Figure 8 is a plan view of a switch mechanism for diverting load carriers from one driven chain to another, Figure 9 is a view taken on the line 9—9 of Figure 8.

Referring to Figures 1 and 2 of the drawings, 10 denotes a conveyor chain which is adapted to run in a fixed track 11 and which carries at its upper part a plurality of rollers 12 which are supported for free rotation about axes transverse to the direction of travel of the chain. The chain 10 and the manner of mounting the rollers 12 thereon are purely exemplary and it is to be understood that any known type of chain may be employed which incorporates rollers freely rotatable about transverse axes and projecting sufficiently above the chain links to provide support for load carriers. If the rollers 12 are supported above the level of the chain as illustrated in Figures 1 and 2 then it will be necessary to incorporate guide rollers such as are indicated in dotted lines at 13 in order to prevent tilting or twisting of the chain about its longitudinal axis.

Instead of employing a drive chain incorporating a plurality of rollers such as 12 it is equally satisfactory to employ a chain such as is shown in Figure 4 which incorporates a plurality of separate plate like members 14 spaced equidistantly along the upper surface thereof and adapted to provide a supporting surface for the load carriers.

Each load carrier may comprise two shoe or skid members 15 and 16 which seat on the rollers 12, or the plate like members 14 of the chain as the case may be, and are coupled together in tandem. To effect the coupling between the members 15 and 16 there is connected centrally to each an upstanding post or the like 17 the upper ends of said posts being interconnected by means of longitudinal coupling bars 18. The upstanding posts 17 are preferably connected to their respective skid members 15 and 16 by means of universal type joints. Mounted in each shoe or skid member at or adjacent each end thereof are freely rotatable rollers 19 the diameters of which are such that they will project laterally from the shoe or skid member and will engage the vertical walls of the track (see Figure 2) or fixed running or guide strips 20 (see Figure 4). The vertical post 17 associated with each shoe or skid member carries a roller 21 which is capable of rotation about a normally horizontal axis and is adapted to cooperate with a running surface 22. Each post also carries at its upper end a second roller 23 which is capable of free rotation about the axis of said post and is adapted to engage the vertical walls of the track (see Figure 2) or fixed running or guide strips 24 (see Figure 4). The rollers 19, 21 and 23 will serve to stabilise the load carrier i. e. to prevent undesired swaying motion thereof either laterally or longitudinally relatively to the driving chain. As shown the points of connection of the vertical posts 17 to their respective skid members will preferably be disposed at the level or in the plane of the rollers 19 so that any lateral thrust exerted by the load will be taken by said rollers.

In the embodiment illustrated in Figures 1 and 2 the load carrier incorporates a load carrying tray or basket 25 supported at its underside by means of a bracket 26 which is pivotally connected at 27 to brackets 28 carried by the longitudinal coupling bars 18. In order to maintain the tray or basket 25 in its operative position shown in full lines a strut in the form of a toggle linkage 29 is provided the arrangement being such on breakage of said linkage the tray or basket 25 will swing downwardly into a discharge position indicated in dotted lines wherein its load will be automatically discharged therefrom. It will be appreciated that it will be a simple matter to arrange for automatic discharge of the load carrying tray or basket of each load carrier at any preselected point along the conveyor path. For example, if all the trays or baskets were all to be unloaded at one point tripping or breaking of the linkage 29 might be effected by means of an appropriate stationary ramp or abutment member at the selected point. To provide for automatic unloading of each tray or basket at a selected one of a number of unloading points it is only necessary to provide at each of the several unloading points a pivoted tongue or thruster element such for example as is indicated at 30 (Figure 3) such tongue being coupled to a solenoid 31 and adapted on energisation of the latter to be actuated to cause tripping or breakage of the linkage 29. By employing on each load carrier a known type of selector mechanism such as is indicated at 32 (Figure 4) which is capable of being set to actuate a preselected one of a number of switches or contacts spaced along the conveyor path it will be possible to ensure energisation of the solenoid at any preselected unloading point and hence to ensure automatic unloading of any tray or basket at such point. The resetting of the load carrying trays or baskets after unloading thereof may be effected by means of stationary ramps or guide rails which are disposed in the path of travel of such trays or baskets and are so formed that as the latter move along they will be progressively raised into their initial positions.

In the embodiment illustrated in Figure 4 a different type of load carrying tray or basket is shown. In this case the tray or basket is permanently inclined being open at its lower end except for a small transverse retaining wall 33 which will serve normally to prevent articles within the tray from sliding therefrom. Disposed in the bottom of the tray or basket is a plate or platform element 34 on which the load will actually rest such plate or platform being pivotally mounted at 35 so that it is capable of being swung upwardly into a position wherein its forward edge will be level with or above the top of the retaining wall 33. In this latter position any articles supported within the tray on the plate or platform 34 will automatically be discharged. It will be a simple matter to arrange for automatic operation of the plate or platform 34 at any selected point along the conveyor path.

While in the embodiment illustrated on Figures 1 and 2 there are two shoe or skid members 15 and 16 coupled together in tandem it may be desirable to employ only one such member and to mount the load carrying tray or basket at the upper end of the single vertical port 17 carried by the shoe or skid member. In such cases it may be desirable to provide two rollers such as 21 such rollers being rotatably mounted in a convenient bracket carried by the post 17 and located one slightly fore and the other slightly aft of such post.

In conveyors of the general kind with which the invention is concerned it is common practice to provide in the conveyor chain at spaced points therealong a plurality of driving dogs or abutments which are adapted to be projected upwardly from the chain to engage recesses or the like in the shoe or skid members thereby to ensure that a positive drive will be imparted to the load carriers when for example they are required to travel along an inclined path.

In Figures 1 and 2 one of such dogs or abutments is shown at 35 it being so mounted as to be capable of an upward and downward sliding movement into and out of an operative position wherein it will engage a shoe or skid member. In the embodiment illustrated the dog is shown in its inoperative or retracted position. Each dog or abutment will extend below the chain and mounted at or adjacent its lower end is a laterally directed roller or the like 36 which is adapted to cooperate with fixed running surface 37. The dog or abutment is spring loaded upwardly and hence by suitably varying the level of the running surface 37 it will be possible to arrange for the dog or abutment to be projected through the chain and into engagement with a shoe or skid member at any selected section of the conveyor path. If desired each shoe or skid member may incorporate a dog ejector device as described in the specification of prior patent application No. 15,985/55.

Any tendency to upward movement of a shoe or skid member due to upward projection of a driving dog or abutment from the chain will be prevented by the roller or rollers 21.

Since the load carrier will normally move with the chain due to the frictional engagement of the shoe or skid members therewith it will be necessary in order to ensure proper engagement between a driving dog or abutment and any load carrier to provide an arrestor mechanism or stop device which will serve temporarily to hold the carrier stationary until, as a result of relative movement of the chain, a dog is brought into position to engage the slot or recess in the shoe or skid member. Numerous devices may be employed for this purpose and one is illustrated in Figures 5 and 6. Referring now to those figures it will be seen that there is provided a stop arm 38 which is adapted normally to lie in the path of travel of the vertical posts 17 on the load carriers thereby to provide a positive stop for the latter. The arm 38 is fixedly mounted on a rod 39 supported for rotation in brackets 40. Fixedly mounted at the lower end of the rod 39 is a second arm 41 which is adapted to project into the path of the rollers 36 carried by the dogs 35. It will be appreciated that as a dog 35 is brought into position wherein it will engage in a slot or recess in a shoe or skid member the roller 36 will abut the arm 41 and thereby cause angular movement of the rod 39 and stop arm 38 sufficient to bring the latter clear of the post 17 so that the load carrier will then be free to proceed positively coupled to the chain by the dog 35. A spring or other suitable means may be incorporated to return the arrestor mechanism to its operative position after each actuation.

In Figure 7 another type of arrestor mechanism is shown. In this case 42 denotes an angled stop arm which is mounted for pivotal movement about a pin 43 carried by a slide member 44 which is slidably supported on a guide rod 45. 46 denotes a compression spring which acts on the slide member 44 and serves to urge the same in the direction of the arrow A. Preferably a spring will be associated with the stop arm 42 urging the same in a clockwise direction as shown into a position wherein the forward or nose end 46 thereof will be in the path of the vertical posts of the load carriers. 47 denotes a small roller or rounded abutment member with which the stop arm is adapted to cooperate on displacement thereof. In the position shown the arm 42 will be effective to halt any load carrier but on engagement of a driving dog with the latter said carrier will then by virtue of its positive connection with the chain be effective to displace said stop arm 42 so that the carrier will then continue its forward travel. After passage of the load carrier the stop arm 42 will automatically reset so that it will hold the next following load carrier until properly engaged by a driving dog.

In order to provide for the possibility of diverting load carriers from a main conveyor line to a branch line or to an associated conveyor it will be necessary to provide a suitable switch device and one possible form of such device is indicated in Figures 8 and 9.

Referring now to those figures, 48 and 49 denote two separate conveyor tracks in each of which a separate driving chain is disposed such chains being adapted to support load carriers of the kind above described. It will be seen that in the region of the transfer or switch point the two conveyor tracks are disposed closely together and in substantially parallel relationship. The switching means for diverting a load carrier from the track 48 to the track 49 will comprise two spaced rail members 50 each of which is pivoted at 51. Coupled to each rail member is an electrically, pneumatically or hydraulically operated thruster 52, such thruster being effective to move said rail members together from the position shown in dotted lines to the position shown in full lines and vice versa. It will be noted that the radius of the rail members 50 is relatively great so that while actually being curved they nevertheless closely approach a straight line formation. The rail members 50 will operate positively to push or slide load carriers laterally from the conveyor 48 to the conveyor 49 and to assist in the passage of carriers from one chain to the other a row of ball casters or the like such as is indicated at 53 may be provided, such casters or the like being adapted to provide temporary substantially frictionless support for the shoes or skid members of the load carriers during passage from one chain to the other.

An arrangement such as is indicated in Figures 8 and 9 will allow for switching of load carriers with a minimum of delay so that the flow of carriers along the main track 48 will be substantially uninterrupted. Immediately a load carrier on the main track 48 clears the switch device the latter may be operated to move the next following trolley laterally across the chains and ball casters 53 and if that is the only trolley to be diverted at that time then immediately it is clear of the switch device the latter may be restored to its initial position.

It may in certain cases be desirable to transfer load carriers from a main line to a reciprocating conveyor of the kind described in the specifications of prior patent applications Nos. 15,281/55 and 20,742/55. In such cases it will however be impracticable to transfer the carriers directly from the main conveyor to the reciprocating conveyor and it may be necessary to provide some subsidiary drive means which will be operative to pick up and impart a positive drive to the load carriers as they are diverted off the main conveyor and to convey the same to the reciprocating conveyor. Such subsidiary drive means may conveniently comprise a normal bush roller chain which is disposed on its side i. e. with the connecting links top and bottom. The chain, which will be endless, will be supported at an appropriate level such that its upper surface on which the load carrier will be supported will be at or approximately at the same level as that of the main and reciprocating conveyors. A separate driven and driving sprocket will be provided for the subsidiary chain and suitable idler or support sprockets and a tensioning device will be incorporated to ensure that the chain will be appropriately tensioned and caused to travel along the required path.

I claim:

1. A conveyor system comprising a fixed track of substantially channel section, an endless driven chain running in said track, skid members supported on said chain for movement therewith, a post carried by each skid member and extending upwardly above the track, anti-friction means associated with each post and skid member to cooperate with the track thereby to prevent both lateral and fore and aft tilting movement of said post and a load supporting tray mounted at the upper end of said post.

2. A conveyor system comprising a fixed track of substantially channel section, an endless driven chain running in said track, skid members supported on said chain for movement therewith, a post carried by each skid member and extending upwardly above the track, anti-friction means associated with each post and skid member to cooperate with the track thereby to prevent both lateral and fore and aft tilting movement of said post, means coupling the posts of successive skid members together in pairs and a load tray supported by each pair of said posts at a level above that of the track.

3. A conveyor system comprising a fixed track of substantially channel section, an endless driven chain running in said track, auxiliary running surfaces disposed within said track at a level above that of the chain, skid members supported directly on said chain for movement therewith, a post carried by each skid member and projecting upwardly above the track, roller means associated with each post and skid member and arranged to cooperate with said auxiliary running surfaces to prevent both lateral and fore and aft tilting movement of said post, and a load supporting tray mounted at the upper end of each post.

4. A conveyor system comprising a fixed track of substantially channel section, an endless driven chain running in said track, auxiliary running surfaces disposed within said track at a level above that of the chain, skid members supported directly on said chain for movement therewith, a post carried by each skid member and projecting upwardly above the track, roller means associated with each post and skid member and arranged to cooperate with said auxiliary running surfaces to prevent both lateral and fore and aft tilting movement of said post, means coupling the posts of successive skid members together in pairs and a load tray supported by each pair of said posts at a level above that of the track.

5. A conveyor system comprising a fixed track of substantially channel section, an endless driven chain running in said track, auxiliary running surfaces disposed within said track at a level above that of the chain, skid members supported directly on said chain for movement therewith, a post carried by each skid member and projecting upwardly above the track, roller means associated with each post and skid member and arranged to cooperate with said auxiliary running surfaces to prevent both lateral and fore and aft tilting movement of said post and a load supporting tray mounted at the upper end of each post in such a manner as to be capable of pivotal movement to effect discharge of a load therefrom laterally having regard to the direction of travel of the chain.

6. A conveyor system comprising a fixed track of substantially channel section, an endless driven chain running in said track, auxiliary running surfaces disposed within said track at a level above that of the chain, skid members supported directly on the chain for movement therewith, a post carried by each skid member and projecting upwardly above the track, roller means associated with each post and skid member and arranged to cooperate with said auxiliary running surfaces to prevent both lateral and fore and aft tilting movement of said post, means coupling the posts of successive skid members together in pairs and a load tray mounted on each pair of posts in such a manner as to be capable of pivotal movement to effect discharge of a load therefrom laterally having regard to the direction of travel of the chain.

7. A conveyor system comprising a fixed track of substantially channel section, an endless driven chain running in said track, auxiliary running surfaces disposed within said track at a level above that of the chain, skid members supported directly on said chain for movement therewith, a post carried by each skid member and projecting upwardly above the track, roller means associated with each post and skid member and arranged to cooperate with said auxiliary running surfaces to prevent both lateral and fore and aft tilting movement of said post, a load supporting tray pivotally mounted at the upper end of each post, collapsible strut means serving normally to support said tray in a load supporting position and means at a selected point along the conveyor path capable of being set to cause collapse of said strut means with consequent tipping of said tray to discharge the load therefrom.

8. A conveyor system comprising a fixed track of substantially channel section, an endless driven chain running in said track, auxiliary running surfaces disposed within said track at a level above that of the chain, skid members supported directly on the chain for movement therewith, a post carried by each skid member and projecting upwardly above the track, roller means associated with each post and skid member and arranged to cooperate with said auxiliary running surfaces to prevent both lateral and fore and aft movement of said post, means coupling the posts of successive skid members together in pairs, a load tray supported for pivotal movement on each pair of said posts, collapsible strut means serving normally to support each tray in a load carrying position and means at a selected point along the conveyor path capable of being set to cause collapse of said strut means with consequent tipping of said tray to discharge the load therefrom.

9. A conveyor system comprising a fixed track of substantially channel section, an endless driven chain running in said track, auxiliary running surfaces disposed within said track above the level of the chain, skid members supported directly on said chain for movement therewith, a post carried by each skid member and projecting upwardly above the track, roller means associated with each post and skid member and arranged to cooperate with said auxiliary running surfaces to prevent both lateral and fore and aft tilting movement of said post, a load tray fixedly mounted at the upper end of each post and platform means within the tray serving actually to support any load placed thereon, said platform means being movable into a position such that any load present thereon will be discharged from said tray.

10. A conveyor system as claimed in claim 9 and further comprising retaining means on each tray adapted normally to retain any load present thereon and means whereby said platform means may be raised clear of said retaining means thereby to allow for discharge of the load from said tray.

11. A conveyor system comprising a fixed track of substantially channel section, an endless driven chain running in said track, auxiliary running surfaces disposed within said track at a level above that of the chain, skid members supported directly on the chain for movement therewith a post carried by each skid member and projecting upwardly above the track, roller means associated with each post and skid member and arranged to cooperate with said auxiliary running surfaces to prevent both lateral and fore and aft tilting movement of said post, means coupling the posts of successive skid members together in pairs, a load tray fixedly mounted on each pair of posts and platform means within said tray serving actually to support any load placed thereon, said platform means being movable into a position such that any load present thereon will be discharged from said tray.

12. A conveyor system as claimed in claim 11 and further comprising retaining means on each tray adapted normally to retain any load present thereon and means whereby said platform means may be raised clear of said retaining means thereby to allow for discharge of the load from said tray.

References Cited in the file of this patent

UNITED STATES PATENTS

| | | |
|---|---|---|
| 2,572,011 | Cohen et al. | Oct. 23, 1951 |
| 2,777,566 | King | Jan. 15, 1957 |

FOREIGN PATENTS

| | | |
|---|---|---|
| 30,111 | Great Britain | Dec. 31, 1896 |